(12) United States Patent
Lao et al.

(10) Patent No.: US 11,853,275 B2
(45) Date of Patent: Dec. 26, 2023

(54) UPGRADING A DATABASE MANAGEMENT SYSTEM DEPLOYED IN A CLOUD PLATFORM

(71) Applicant: salesforce.com, inc., San Francisco, CA (US)

(72) Inventors: John Fargo C. Lao, Fremont, CA (US); Brett Michael Procek, Berkeley, CA (US); Peter Thang Doan, San Francisco, CA (US); Swadesh Raj Bhattarai, Fremont, CA (US); Shivakarthik Subramanyam, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/320,969

(22) Filed: May 14, 2021

(65) Prior Publication Data

US 2022/0365915 A1    Nov. 17, 2022

(51) Int. Cl.
  *G06F 16/21* (2019.01)
  *G06F 9/445* (2018.01)
  *G06F 8/71* (2018.01)
  *G06F 8/65* (2018.01)

(52) U.S. Cl.
  CPC ........ *G06F 16/217* (2019.01); *G06F 9/44505* (2013.01); *G06F 16/211* (2019.01)

(58) Field of Classification Search
  CPC .......................... G06F 16/211; G06F 9/44505
  USPC .......................................................... 707/609
  See application file for complete search history.

(56) References Cited

U.S. PATENT DOCUMENTS

| | | | |
|---|---|---|---|
| 2007/0299858 A1* | 12/2007 | Norcott | G06F 16/211 707/999.102 |
| 2016/0041889 A1* | 2/2016 | Banerjee | G06F 9/45558 714/4.11 |
| 2019/0369980 A1* | 12/2019 | Mair | H04L 67/34 |
| 2020/0394110 A1* | 12/2020 | Ramohalli Gopala Rao | H04L 69/04 |

\* cited by examiner

*Primary Examiner* — Kuen S Lu

(57) ABSTRACT

A system, for example, a multi-tenant system performs upgrades of database management systems deployed on a cloud platform. The database management system is stored on the cloud platform in a data storage unit for storing data of the database, and an instructions storage unit for storing executable instructions. A cloud platform image comprising instructions for the database management system is received. A cloud platform image is deployed on a new instructions storage unit. An upgraded database management system is built by providing the new instructions storage unit with access to the data storage unit. In an embodiment, the database management system is used by a multi-tenant system and stores a multi-tenant schema. The structure of the multi-tenant schema is defined using a multi-tenant schema template that is included in the instructions storage unit.

20 Claims, 11 Drawing Sheets

UPGRADING A DATABASE MANAGEMENT SYSTEM DEPLOYED IN A CLOUD PLATFORM

BACKGROUND

Field of Art

This disclosure relates in general to cloud computing platforms and in particular to upgrading database management systems deployed in cloud platforms.

Description of the Related Art

Organizations are increasingly relying on cloud platforms such as AWS (AMAZON WEB SERVICES), GOOGLE cloud platform, MICROSOFT AZURE, and so on for their infrastructure needs. Cloud platforms provide servers, storage, databases, networking, software, and other computing resources over the internet to organizations. Organizations are shifting their information technology (IT) infrastructure to cloud platforms to take advantage of the scalability and elasticity of computing resources provided by the cloud platforms. An important component of the IT infrastructure being moved to cloud platforms by organizations includes databases of the organization. Online system such as multi-tenant systems store data of multiple enterprises in a database or in multiple databases. Each database of a multi-tenant system may store data of multiple enterprises that act as tenants of the multi-tenant system.

When such online systems receive a new release or version of the database management system, they need to upgrade instances of database management system deployed in the cloud platform. Vendors of database managements systems provide scripts and instructions for performing upgrades. These scripts perform in-place upgrade of the database management system, by modifying the current installation of the database management system. These instructions may not work on database management systems deployed in cloud platforms because cloud platforms enforce immutable infrastructure approach to upgrading applications and software systems. Accordingly, applications and software systems deployed on a cloud platform are not upgraded in place but replaced with a new image. Therefore, conventional techniques for upgrading a database management system do not work on database management systems deployed on cloud platforms.

Figure 1:
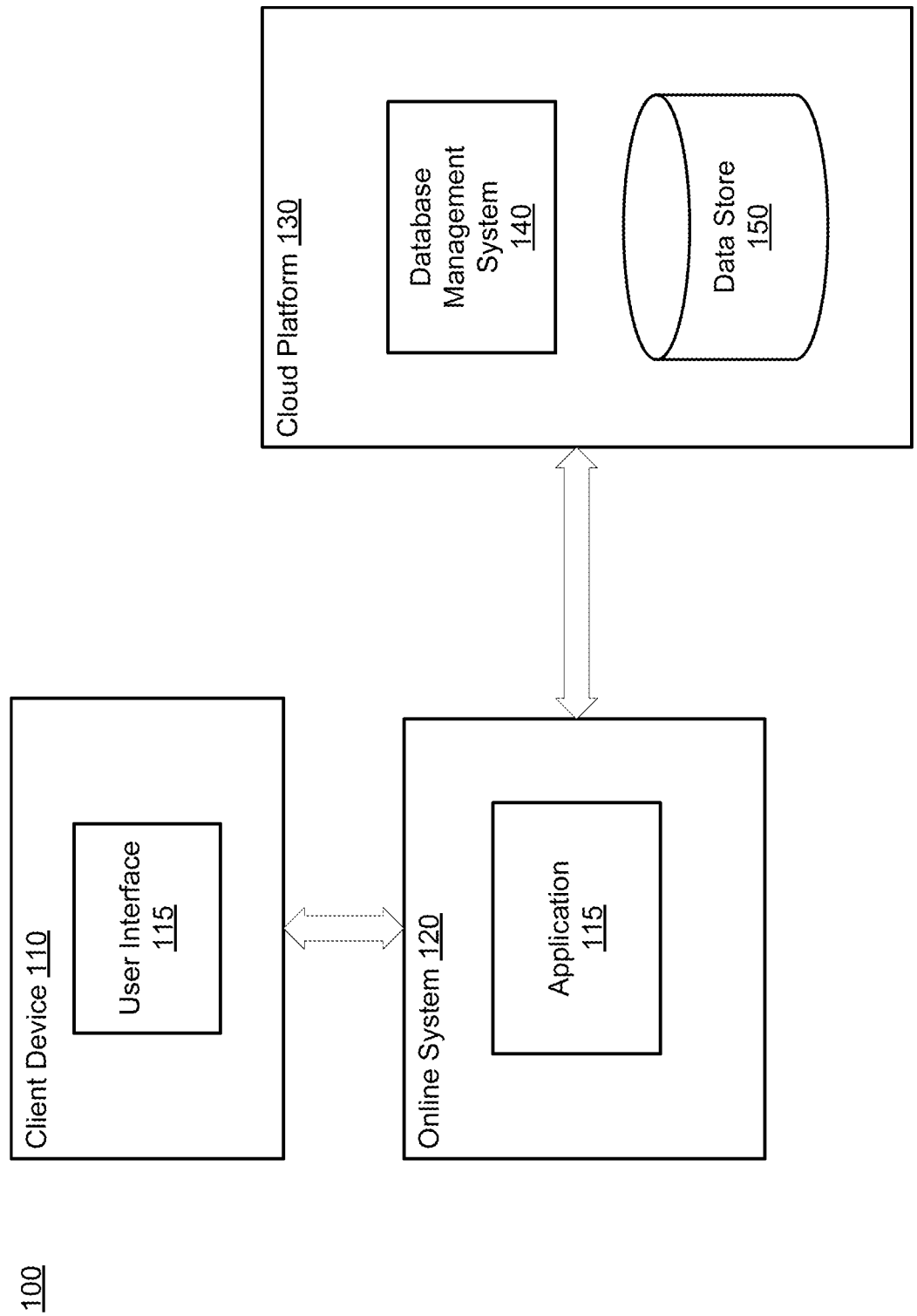
FIG. 1 is a block diagram of a system environment 100 illustrating an online system that uses a database management system deployed on a cloud platform, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

An online system performs upgrades of database management systems deployed on a cloud platform that enforces immutability in infrastructure. According to an embodiment, a request is received to upgrade a database management system deployed on the cloud platform. The database management system is stored on the cloud platform in (1) a data storage unit for storing data of the database, and (2) an instructions storage unit for storing executable instructions. A cloud platform image comprising instructions for the database management system is received. The cloud platform image is deployed on a new instructions storage unit. An upgraded database management system is built by providing the new instructions storage unit with access to the data storage unit. The system provides users with access to the upgraded database management system.

According to an embodiment, a system performs upgrades of a database management system deployed on a cloud platform used by a multi-tenant system. The database management system is stored using (1) an instructions storage unit that stores instructions of the database management system for processing data of the database and (2) a data storage unit that stores data of a database. In an embodiment, the system prevents sharing of data across instructions storage unit and data storage unit A cloud platform image is received. The cloud platform image includes (1) instructions for the database management system and (2) a multi-tenant schema template. The cloud platform image is deployed on a new instructions storage unit. The instructions for the database management system may include operating system level instructions and application level instructions.

A determination is made, whether a multi-tenant schema exists on the database stored on the data storage unit. If the multi-tenant schema exists on the data storage unit, a determination is made, whether the multi-tenant schema template of the cloud platform image has a newer version of multi-tenant schema compared to the database stored on the data storage unit. Instructions stored in the cloud platform image are executed for upgrading the multi-tenant schema of the database stored in the data storage unit. If the multi-tenant schema does not exist on the data storage unit, a multi-tenant schema is created based on the multi-tenant schema template. An upgraded database management system is built by providing the new instructions storage unit with access to the data storage unit. Tenants of the multi-tenant system are provided with access to the upgraded database management system.

According to an embodiment, the instructions storage unit comprises (1) a system storage unit storing operating systems instructions and (2) an application storage unit storing instructions of the database management system. The applications storage unit further stores (a) one or more database configuration files (b) one or more schema templates, and (c) provisioning instructions.

System Environment

FIG. 1 is a block diagram of a system environment illustrating an online system that uses a database management system deployed on a cloud platform, according to one embodiment. The system environment 100 comprises an online system 120, a cloud platform 130, and one or more client devices 110. A cloud platform may also be referred to herein as a cloud computing platform. In other embodiments, the system environment 100 may include other more or fewer components, for example, there may be multiple cloud platforms 130 used by the online system 110.

The cloud platform 130 includes the database managements system 140 and data store 150. The online system 110 executes an application 115 that uses the database management system 140 deployed on the cloud platform 130. The database managements system 140 includes instructions for processing data stored in data store 150. The database management system 140 may be a relational database management system such as ORACLE, DB2, MYSQL, PostgreSQL, and so on but is not limited to relational database management systems. For example, the database management system may be a NOSQL database that stores key-value pairs or a column-oriented database. The database management system may include instructions for various components, for example, a query processor, a query parser, query planner, a query compiler, a query optimizer, an execution engine and so on. The database management system provides instructions for upgrading the database management system in place.

The cloud platform 130 uses an immutable infrastructure approach. Accordingly, software installed on the cloud platform 130 cannot be upgraded in place. For example, assume that the database management system 140 runs version V1 of software and needs to be upgraded to version V2. The immutable infrastructure approach requires that the executables of the database management system 140 version V1 installed on the cloud platform 130 are not modified to upgrade the software to version V2. Instead, a new instance of the management system 140 is installed for version V2 and online traffic moved from the old instance running version V1 to the new instance running version V2. However, conventional database management systems use a mutable infrastructure approach and provide instructions that require the software to be upgraded in place. For example, one or more executable files storing instructions for components of the database management system are replaced with modified executable instructions. Accordingly, conventional database management systems provide instructions to modify the executables of the instance running version V1 so that the instance is modified to run version V2. As a result, the conventional approach to upgrading database management systems does not work on database management systems that are deployed on cloud platforms.

The application 115 may be a web application that receives requests from client devices and may execute database queries using database management system that may be running on the cloud platform. The application 115 configures a user interface 115 for display on a client device 110. The user interface may be displayed by an application running on the client device 110, for example, a browser application. The user interface 115 may allow a user to interact with the online system 120 to access data stored in the data store 150 or update the data stored in the data store 150. For example, the user may execute an application in connection with an interaction with one or more other users to complete a transaction.

In some embodiments, the online system 110 is a multi-tenant system. A tenant of the multi-tenant system may be an enterprise or an organization. A tenant may represent a customer of the multi-tenant system that has multiple users that interact with the multi-tenant system via client devices 105.

A multi-tenant system stores data for multiple tenants in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system may execute an application server that simultaneously processes requests for a number of tenants. However, the multi-tenant system enforces tenant-level data isolation to ensure that jobs of one tenant do not access data of other tenants.

The database management system 140 manages data that is processed by the online system 110. In embodiments where the online system is a multi-tenant system, the database management system 140 stores data for various tenants of the multi-tenant system. The database management system 140 may store data for different tenants in separate physical structures, for example, separate database tables or separate databases. Alternatively, the database management system 140 may store data of multiple tenants in a shared structure. For example, user accounts for all tenants may share the same database table. The multi-tenant system stores additional information to logically separate data of different tenants. Accordingly, the multi-tenant system implements a multi-tenant schema configured to store data for multiple tenants in a shared structure while maintaining data isolation. According to one embodiment, the online system 100 is configured to provide webpages, forms, applications, data and media content to client devices 110 to support the access by client devices 110 as tenants of online system 100. As such, online system 100 provides security mechanisms to keep each tenant's data separate unless the data is shared.

In one embodiment, the online system 110 is a multi-tenant system that implements a web-based customer relationship management (CRM) system and the application server 120 provides users access to applications configured to implement and execute CRM software applications. The multi-tenant schema may include structures such as database tables to manage the data for CRM software. For example, the online system 100 may provide tenant access to multiple hosted (standard and custom) applications, including a CRM application.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the client devices, the online system, and the cloud platform are typically performed via a network, for example, via the Internet. In one embodiment, the network uses standard communications technologies and/or protocols. In another embodiment, the entities can use custom and/or dedicated data communications technologies instead of, or in addition to, the ones described above. The techniques disclosed herein can be used with any type of communication technology, so long as the communication technology supports receiving by the online system of web requests from a sender, for example, a client device and transmitting of results obtained by processing the web request to the sender.

Although the system architecture and several processes described herein are illustrated using a multi-tenant system, the techniques disclosed are not limited to multi-tenant systems but can be executed by any online system, for example, an online system used by a single enterprise.

System Architecture

Figure 2:
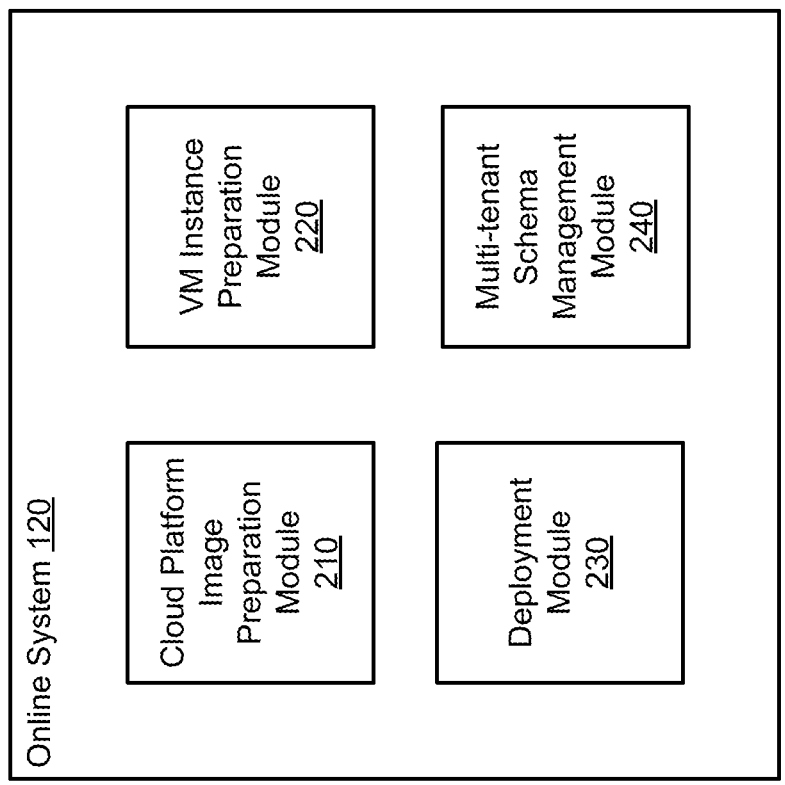
FIG. 2 is a block diagram illustrating architecture of an online system configured to upgrade a database management system deployed on a cloud platform, according to one embodiment.

FIG. 2 is a block diagram illustrating architecture of an online system configured to upgrade a database management system deployed on a cloud platform, according to one embodiment. The online system 120 includes a cloud platform image preparation module 210, a deployment module 220, and an instructions store 230. Other embodiments can have different and/or other components than the ones described here, and the functionalities can be distributed among the components in a different manner. The modules described may be stored in a system other than the online system 120. For example, some or all of the instructions of the deployment module 220 may be stored and executed on the cloud platform 130.

The instructions store 230 stores instructions of the database management system. These include instructions of the relevant version of the operating system as well as application level instructions of the database management system, for example, instructions for processing data stored in a database. The instructions of the database management system may be stored as libraries of executable instructions, for example, binary files. An upgrade may update one or more libraries storing instructions of the database, for example, to add new features or to fix certain known defects in the instructions.

The cloud platform image preparation module 210 collects all instructions relevant for deploying a version of a database management system on the cloud platform and prepares a cloud platform image. Examples of cloud platform images include AMI (AMAZON machine image) or a VM image of Azure or an image configured for any other cloud platform, for example, GCP (GOOGLE CLOUD PLATFORM). The cloud platform image is provided to the cloud platform for deploying the database management system or for upgrading the database management system to a new version.

The deployment module 220 provides instructions to the cloud platform for deploying the database management system. The deployment module 220 may execute instructions on the cloud platform for performing upgrades to the database management system. In an embodiment, the deployment module specifies a pipeline of various stages that perform various tasks related to upgrading the database management system in the cloud platform.

Database Virtual Machine

Figure 3:
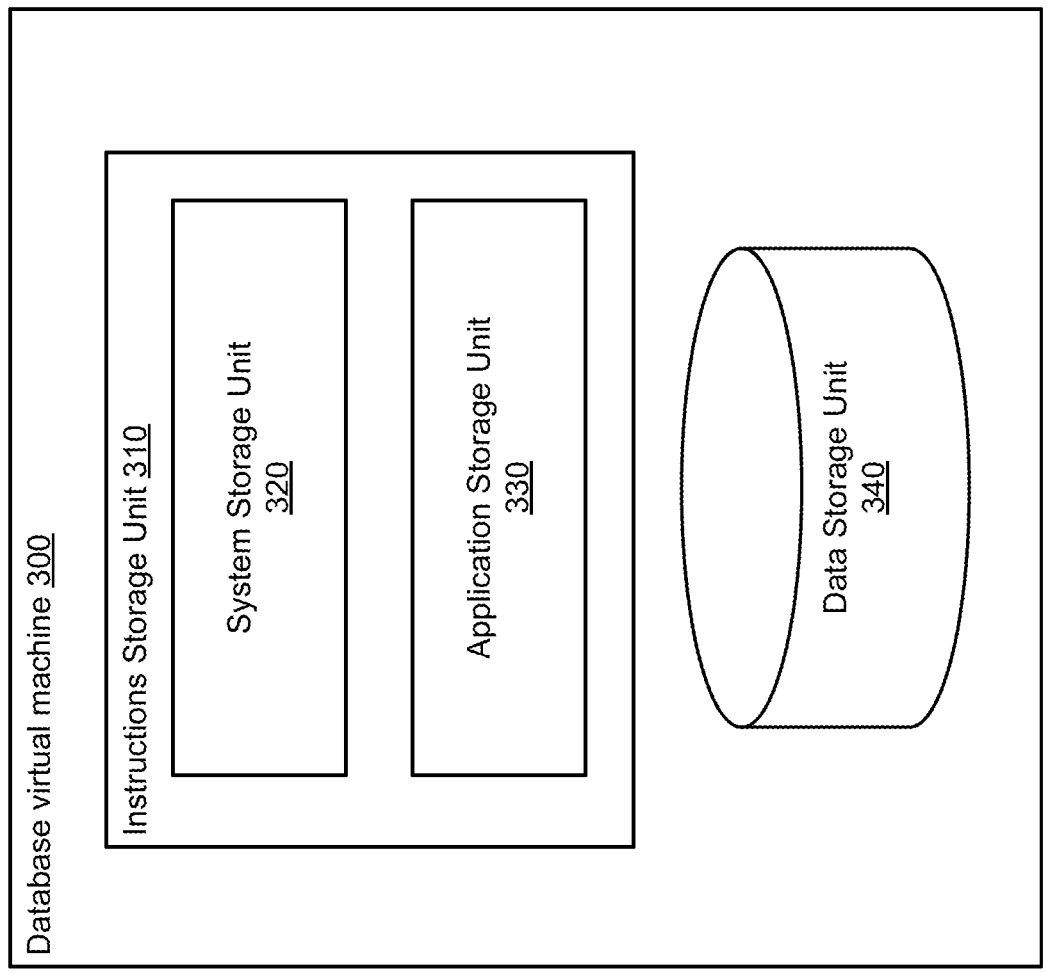
FIG. 3 is a block diagram illustrating architecture of a database virtual machine instance configured to run on a cloud platform, according to one embodiment.

FIG. 3 is a block diagram illustrating architecture of a database virtual machine instance configured to run on a cloud platform, according to one embodiment. The database virtual machine 300 runs on a cloud platform and stores instructions and data of a database management system.

The database management system may store data on multiple databases that are stored in one site of different sites. A site may refer to a physical location in which computing resources are kept. For example, a site may be a data center comprising hardware including processors and storage devices. The database stores data and allows users to perform queries that may access data as well as modify the data. For example, the database may store records comprising fields and a query may insert new records, update existing records, and delete records. A query may request fields of records. The database is typically replicated. For a multi-tenant system, the database may store data for multiple enterprises, each enterprise representing a tenant of the multi-tenant system.

In an embodiment, the database management system processes user queries to process data stored in database. In an embodiment, the database management system processes queries in a particular query language, for example, structured query language (SQL). A query may be used to perform an action using the database, for example, update a record, add new record, or delete a record. The query may be used to access information, for example, values stored in one or more records.

The cloud platform stores data and instructions in storage units. A system using the cloud platform requests specific storage units and use them for specific purposes. Examples of storage units of cloud platform include elastic block store (EBS), or a logical unit number (LUN), or any other unit representing a portion of one or more storage devices that is allocated for a specific usage. A storage unit may also be referred to herein as a disk.

The database virtual machine 300 is configured so that the storage of the database management system is allocated into two distinct sets of storage units. The instructions of the database management system are stored in an instructions storage unit 310 and the data stored and processed by the database management system is stored in data storage unit 340. In an embodiment, the instructions storage unit further comprises a system storage unit 320 and an application storage unit 330.

The application storage unit 330 stores application level instructions of the database management system. The system storage unit 320 stores system level instructions that are low level instructions and are part of an operating system. For example, the system storage unit 320 stores system level instructions of the operating system related to booting and running the server (for example, the host of the virtual machine), data access operations, caching operations, input/output operations and so on.

The application level instructions may invoke the system level instructions. The application level instructions implement the functionality of the database management system including the query processing, database commands, and so on. The application level instructions also include configuration parameters for setting up the database management system. Typically, application level code is developed by developers that work on various aspects of a database management system for implementing features of the database management system.

The application level instructions further include schema templates for applying to the database. The schema templates create or update database predefined database objects that may be used for specific purposes. For example, the application level instructions include a multi-tenant schema that creates tables and other database structures for maintaining a multi-tenant system.

In an embodiment, the system prevents sharing of data across instructions storage unit and data storage unit. The tracks all the systems, applications, and data storage units attached to the virtual machine to ensure that each storage unit is used for the intended purpose. For example, the system checks to ensure that no user data of the database is stored in the instructions storage unit 310 and no instructions of the database management system are stored in the data storage unit 340. The system may be the online system 120 or the cloud platform 130. In an embodiment, the system receives instructions to allocate data files of the database and executable files of the database management system on various storage units. The system checks if there is any overlap in the storage units used for storing executable files and the storage units used for storing data files. If the system detects an overlap in the storage units used for storing executable files and the storage units used for storing data files, the system returns an error and fails the command used for allocating the storage. If the system detects no overlap in the storage units used for storing executable files and the storage units used for storing data files, the system successfully executes the command used for allocating the storage.

The instructions storage units are immutable whereas the data storage units are mutable or persistent and can be tracked. Accordingly, if the database virtual machine instance is updated, the instructions storage unit including the system storage unit and the application storage unit is erased and replaced with a new version of software whereas the data storage unit is left as it is through the upgrade process. In an embodiment, the data storage unit is detached from the instructions storage unit of the older version of the database management system and reattached to a new instructions storage unit storing the new version of the database management system to which the virtual machine is being upgraded. In some embodiments, the data storage unit is cloned to generate a replica of the data and the replica is attached to the instructions storage unit storing the new version of the database management software.

Figure 4:
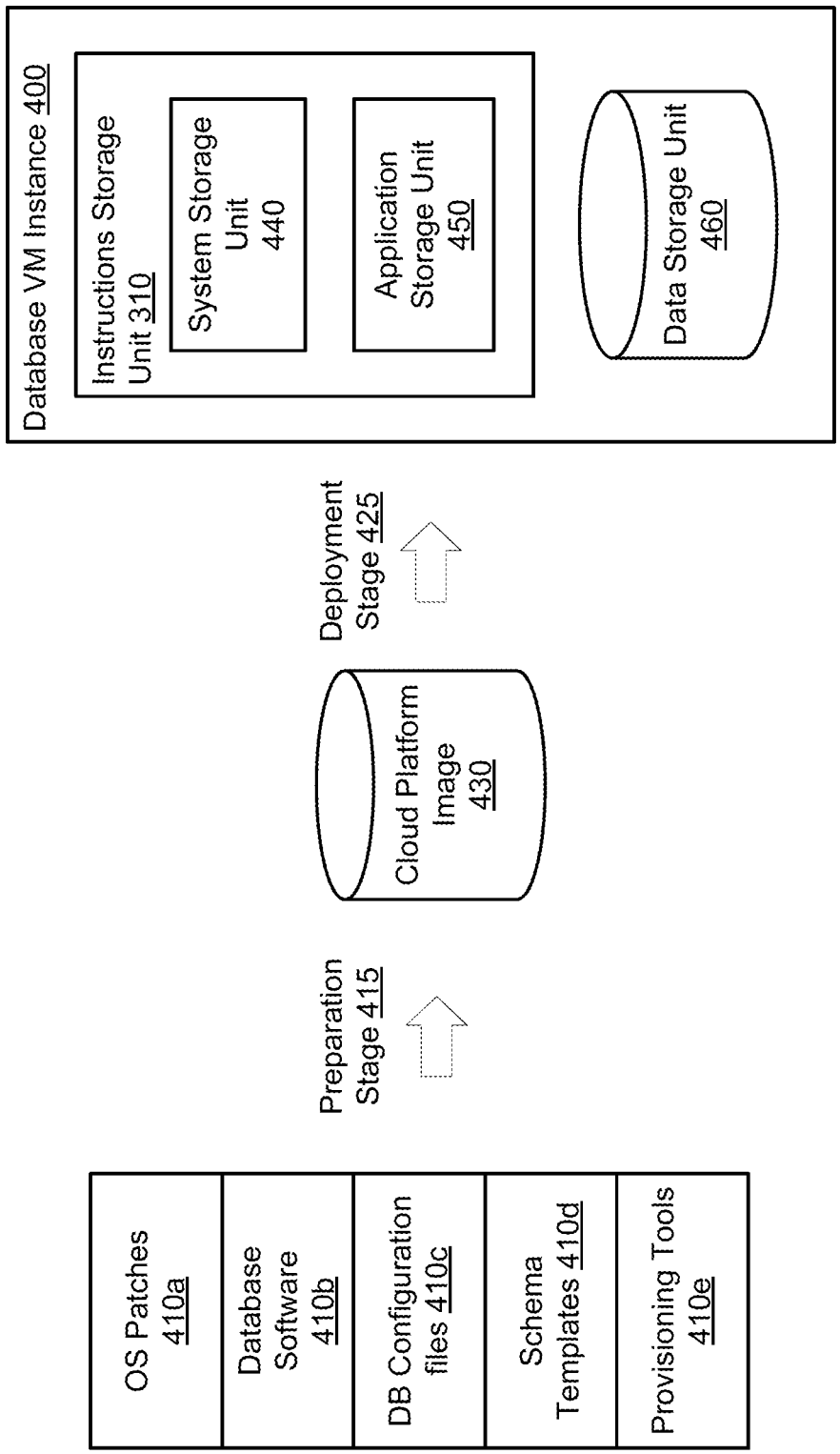
FIG. 4 is a block diagram illustrating stages of deployment of a database virtual machine instance on a cloud platform, according to an embodiment.

FIG. 4 is a block diagram illustrating stages of deployment of a database virtual machine instance on a cloud platform, according to an embodiment. The deployment of a database virtual machine instance comprises two stages, a preparation stage 415 and a deployment stage 425. In the preparation stage, the system creates a cloud platform image 430 including various components 410 such as: (1) the latest operating system (OS) patches 410a; (2) the database software 410b; (3) the latest database configuration settings files 410c; (4) the latest database schema template files 410d; and (5) the provisioning tools 410e representing instructions that are executed during the provisioning of the database virtual machine instance.

In the deployment stage 425, the cloud platform receives the cloud platform image 430 created in the preparation stage 415 and deploys a database virtual machine instance 400 configured to run the database management system. The cloud platform mounts the data storage unit 460 if available to the database virtual machine instance 400. The database management system may not be associated with a previous data storage unit, for example, if this is the first time the database management system is being installed by an organization and there is no previously stored data in the databases managed by the database managed system. If the database management system is not associated with a previous data storage unit, the cloud platform creates a new (empty) data storage unit 460 and mounts it on the database virtual machine instance 400. The cloud platform attaches the data storage unit 460 to the instructions storage unit 435 in the database virtual machine instance 400.

The cloud platform executes the provisioning tools 410e to perform various actions such as configuring the target database profile and configuration and applying the latest schema templates 410d by ensuring that the database schema conforms to the latest schema templates. The OS patches 410a are stored in the system storage unit 440 of the instructions storage unit 310 and the remaining components 410b, 410c, 410d, and 410e and stored in the application storage unit 450 of the instructions storage unit 310. Once the database VM instance 400 is configured, the cloud platform starts up the database management system and makes the running database management system available to users of the online system 120, for example, to tenants of a multi-tenant system.

Process of Upgrading a Database Management System Deployed on a Cloud Platform

FIGS. 5-10 illustrate various processes performed by the systems for performing upgrades of database management systems deployed on the cloud platform. The steps indicated in the various processes may be performed in an order different from that indicated. Furthermore, the steps may be performed by modules different from those indicated herein. The term system may refer to the online system 120 or the cloud platform 130. Accordingly, steps may be performed by the cloud platform or by the online system or by both platforms in conjunction with each other.

Figure 5:
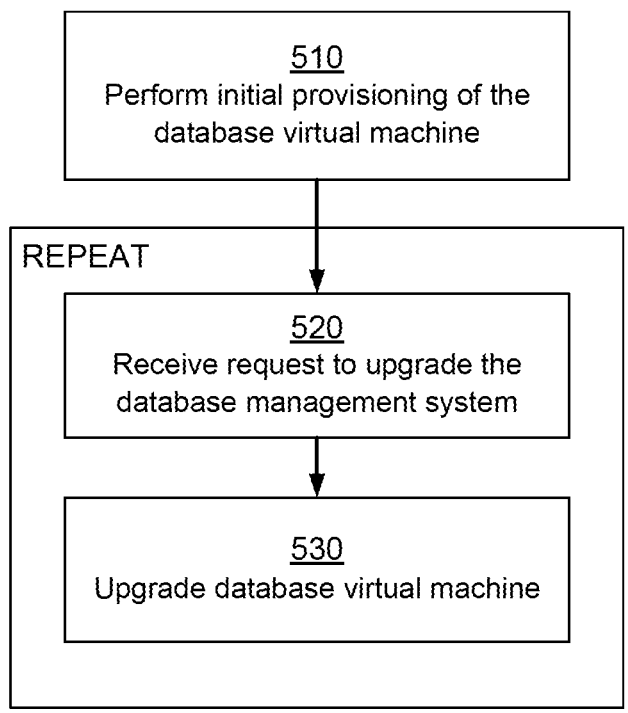
FIG. 5 is an flow chart illustrating the overall process for performing an upgrade of a database management system deployed on a cloud platform, according to one embodiment.

FIG. 5 is a flow chart illustrating the overall process for performing an upgrade of a database management system deployed on a cloud platform, according to one embodiment. The system performs initial provisioning 510 of the database virtual machine. The system may repeat steps 520 and 530 multiple times. The system receives 520 a request to upgrade the database management system. In response to the received request, the system upgrades 530 the database virtual machine. Accordingly, the cloud platform performs initial provisioning of the database virtual machine once but may perform upgrades of the database virtual machine multiple times. Upgrades of a database management system may be performed as newer releases or patches of the database management system are received, if a patch of the underlying operating system libraries is received, if there are upgrades to the database management system configurations or upgrades to the multi-tenant schema template or other schema template.

Figure 6:
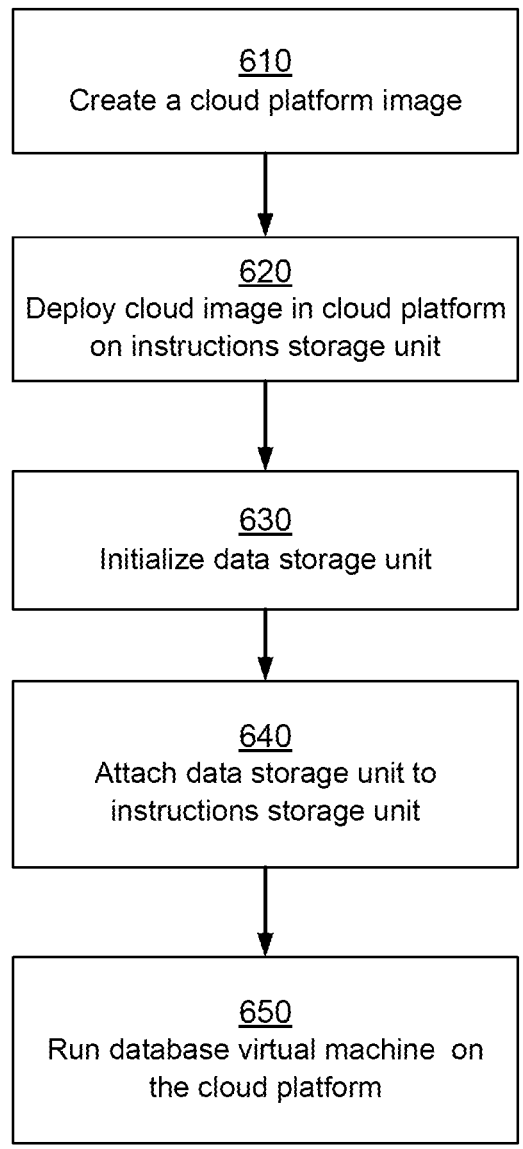
FIG. 6 is a flow chart illustrating the process for performing initial provisioning of the database virtual machine, according to one embodiment.

FIG. 6 is a flow chart illustrating the process for performing initial provisioning 510 of the database virtual machine, according to one embodiment. In an embodiment, the online system executes a workflow to prepare and configure the cloud platform (VM). The system creates 610 a cloud platform image comprising instructions of the database management system. This is the preparation stage. The cloud platform image stores both the latest operating system patches and database management software. The cloud platform image is stored on a shared image repository of the cloud platform accessible by the systems executing the deployment stage.

The system deploys the cloud platform image in the cloud platform. The instructions of the cloud platform image are stored in the instructions storage unit 310. The system initializes the data storage unit 340 to an empty storage unit without any data. The system attaches 640 the data storage unit to the instruction storage unit and runs 650 the database virtual machine on the cloud platform. The system invokes cloud platform APIs to attach and detach the required storage units.

Figure 7:
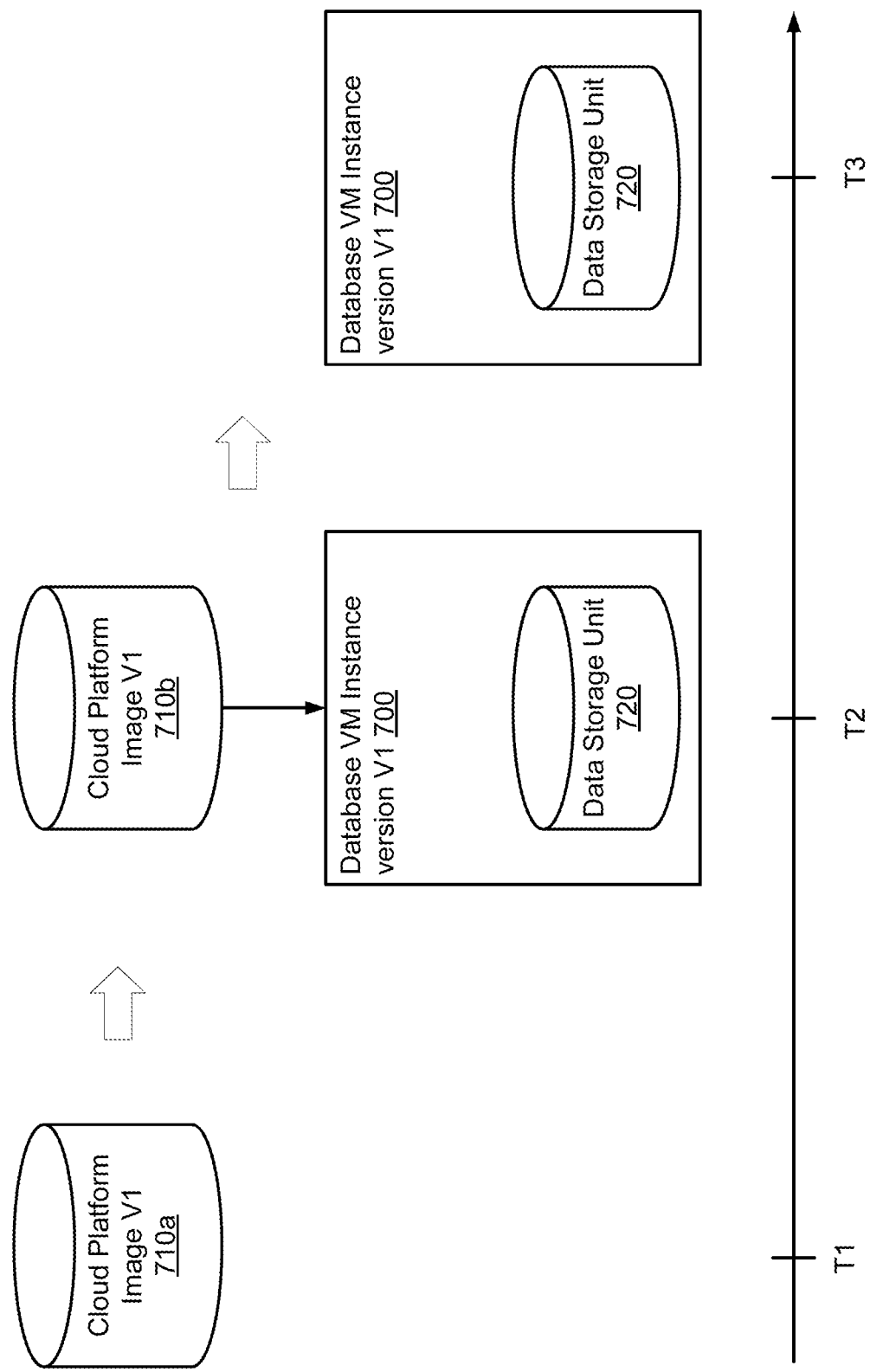
FIG. 7 illustrates the process for performing initial provisioning of the database virtual machine, according to one embodiment.

FIG. 7 illustrates the process for performing initial provisioning of the database virtual machine, according to one embodiment. FIG. 7 shows a timeline illustrating various stages of the initial provisioning of the database virtual machine. As shown in FIG. 7, at time T1, the cloud platform image 710*a* is created. The cloud platform image 710*a* may be created in a system outside the cloud platform 130, for example, in the online system 120 and transmitted to the cloud platform 130 and stored in the cloud platform 130 as cloud platform image 710*b*. At time T2, the data storage unit 720 is initialized as an empty storage unit with no data. The cloud platform image 710*b* is attached to the data storage unit 720 to configure the database VM instance 700. The cloud platform image is assumed to have database management software version V1. Accordingly, the database VM instance created has version V1 of the database management system. At T3, the database VM instance 700 starts execution and is made available to users for processing data that may be stored in the data storage unit 720.

Figure 8:
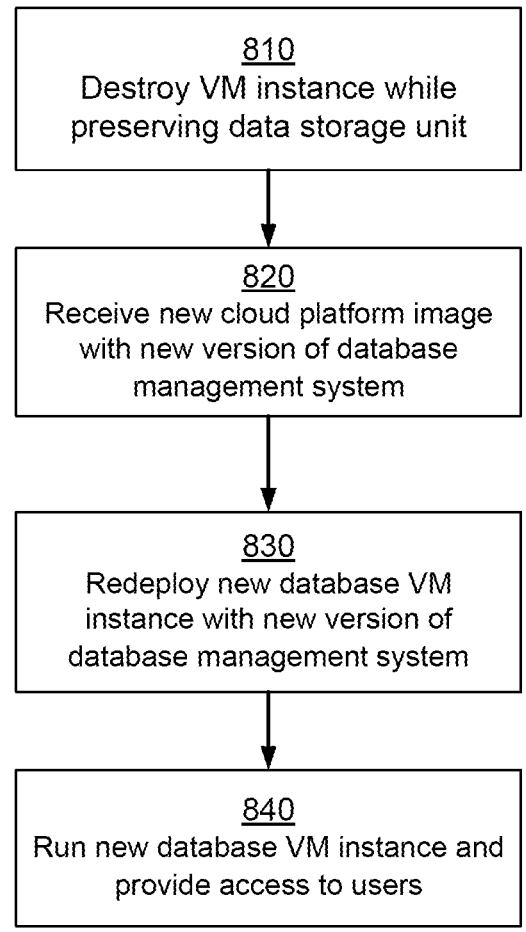
FIG. 8 is a flow chart illustrating the process for upgrading an existing database virtual machine, according to one embodiment.
Figure 9:
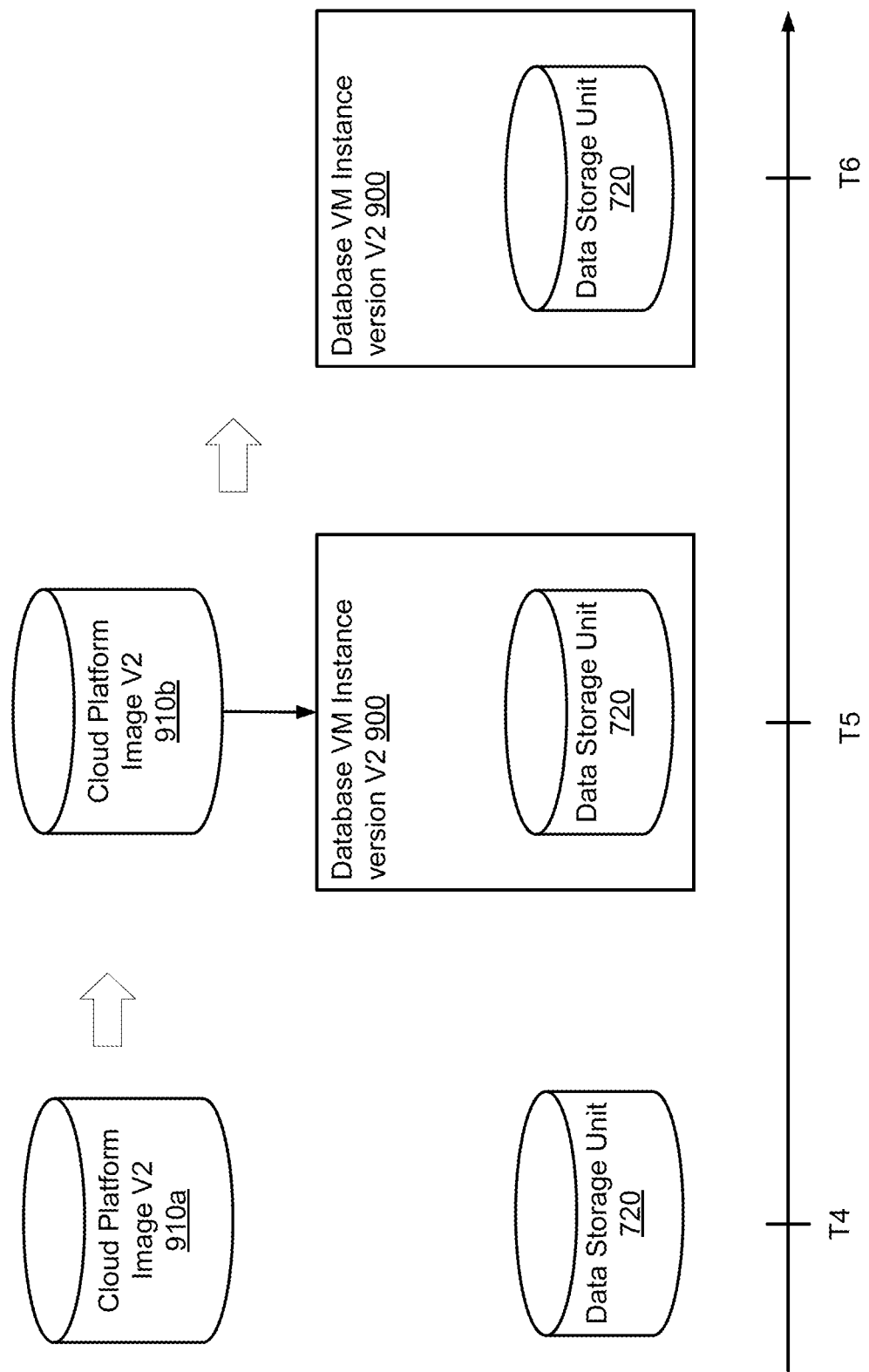
FIG. 9 illustrates the process for upgrading an existing database virtual machine, according to one embodiment.

FIG. 8 is a flow chart illustrating the process for upgrading an existing database virtual machine, according to one embodiment. FIG. 9 illustrates the process for upgrading an existing database virtual machine, according to one embodiment. FIG. 9 shows an exemplary timeline of operations performed during the upgrade process. The timeline shown in FIG. 9 is assumed to occur after the time T3 shown in the timeline of FIG. 7.

The cloud platform identifies an existing database VM instance for upgrading, for example, a database VM instance that was initialized by the process illustrated in FIGS. 6-7. The new VM image is created that includes both the latest operating system patches and database management system software. The cloud-platform image 910*a* shown in FIG. 9 represents the cloud platform image based on version V2 of the software for the database management system. The cloud platform destroys the identified database VM instance while preserving the data storage unit 720 of the database VM instance.

The cloud platform may shutdown the database VM instance before destroying the virtual machine instance. In an embodiment, destroying a virtual machine instance is performed simply by marking the virtual machine as unusable or as deleted. The cloud platform may reclaim the storage of the virtual machine at a later stage, for example, as a batch process that consolidates the storage of the cloud platform. The cloud platform detaches the data storage unit 720 from the instruction storage unit of the database VM instance and destroys the instruction storage unit while keeping the data storage unit. In some embodiments, the cloud platform may clone the data storage unit and attach the clone of the data storage unit to the new instruction storage unit with version V2 of the database management system.

The cloud platform receives 820 the new cloud platform image 910*b* that stores a new version of the database management system software, for example, version V2. The cloud platform redeploys 830 the new database VM instance with the new version of the database management system. Accordingly, the cloud platform creates a new instructions storage unit storing instructions for the new version of the database management system and attaches the new instructions storage unit to the existing data storage unit or to a clone of the existing data storage unit. The cloud platform remounts the data storage units and runs any scripts that perform any tasks related to upgrade of the database management system. The timeline shown in FIG. 9 shows the redeployed database VM instance 900 at time T5. The cloud platform runs 840 the new database VM instance and provides users with access to the running database VM instance. The running database VM instance 900 is shown at time T6 in FIG. 9.

Figure 10:
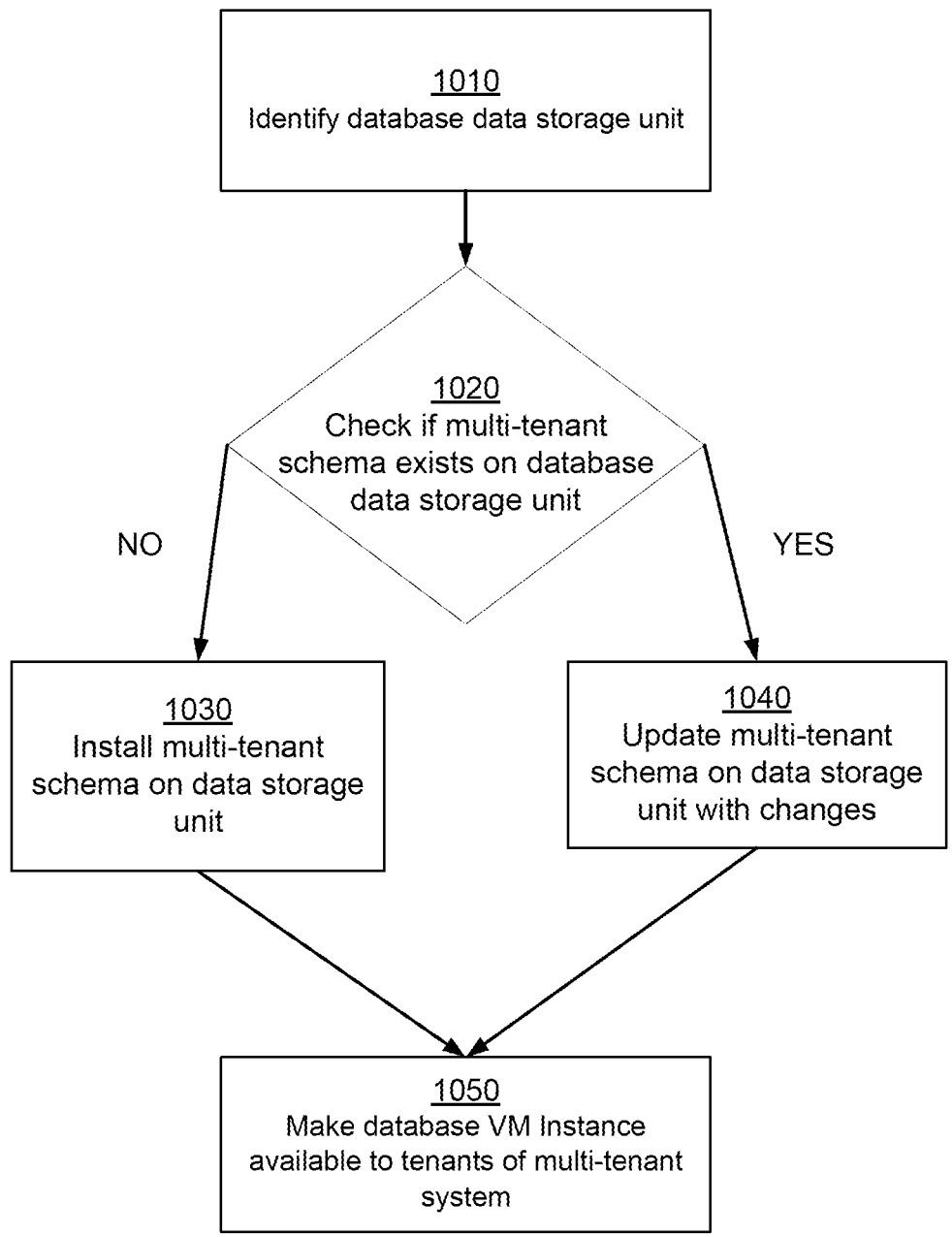
FIG. 10 is a flow chart illustrating the process for upgrading a multi-tenant schema on a database management system deployed on a cloud platform, according to one embodiment.

FIG. 10 is a flow chart illustrating the process for upgrading a multi-tenant schema on a database management system deployed on a cloud platform, according to one embodiment. The process of FIG. 10 is performed during initialization of the database VM instance as shown in FIGS. 6-7 as well as during upgrades of the database VM instance as shown in FIGS. 8-9. The cloud platform identifies 1010 the data storage unit of the database VM instance being initialized or upgraded. The cloud platform checks if the multi-tenant schema exists on the database storage unit. The cloud platform may check if the multi-tenant schema exists by checking presence of one or more tables or other data that is characteristic of the multi-tenant schema.

If the cloud platform determines that the multi-tenant schema does not exist on the data storage unit, the cloud platform installs 1030 the multi-tenant schema on the data storage unit. If the cloud platform determines that the multi-tenant schema exists on the data storage unit, the cloud platform updates 1040 the multi-tenant schema on the data storage unit with changes in the multi-tenant schema of version V2 compared to the multi-tenant schema of version V1. After the cloud platform installs 1030 or updates 1040 the multi-tenant schema, the cloud platform makes 1050 the database VM instance available to tenants of the multi-tenant system. The system triggers a workflow selecting the appropriate schema for the target database systems. The system stores a repository of different schemas, for example, commerce cloud schema, core schema, live agent schema, monitoring schema, and so on. Depending on the context in which the database system is being used, the system selects the right schema for configuring the target database system.

In an embodiment, the various processes shown in FIGS. 6-10 are orchestrated using an orchestration engine used for deploying software on the cloud platform, for example, spinnaker. The system may invoke various tools, for example, continuous delivery platforms such as SPINNAKER for overall orchestration, tools such as TERRAFORM for resource provisioning, building, changing, and versioning database infrastructure, and proprietary tools or scripts for configuring the database.

Computer Architecture

Figure 11:
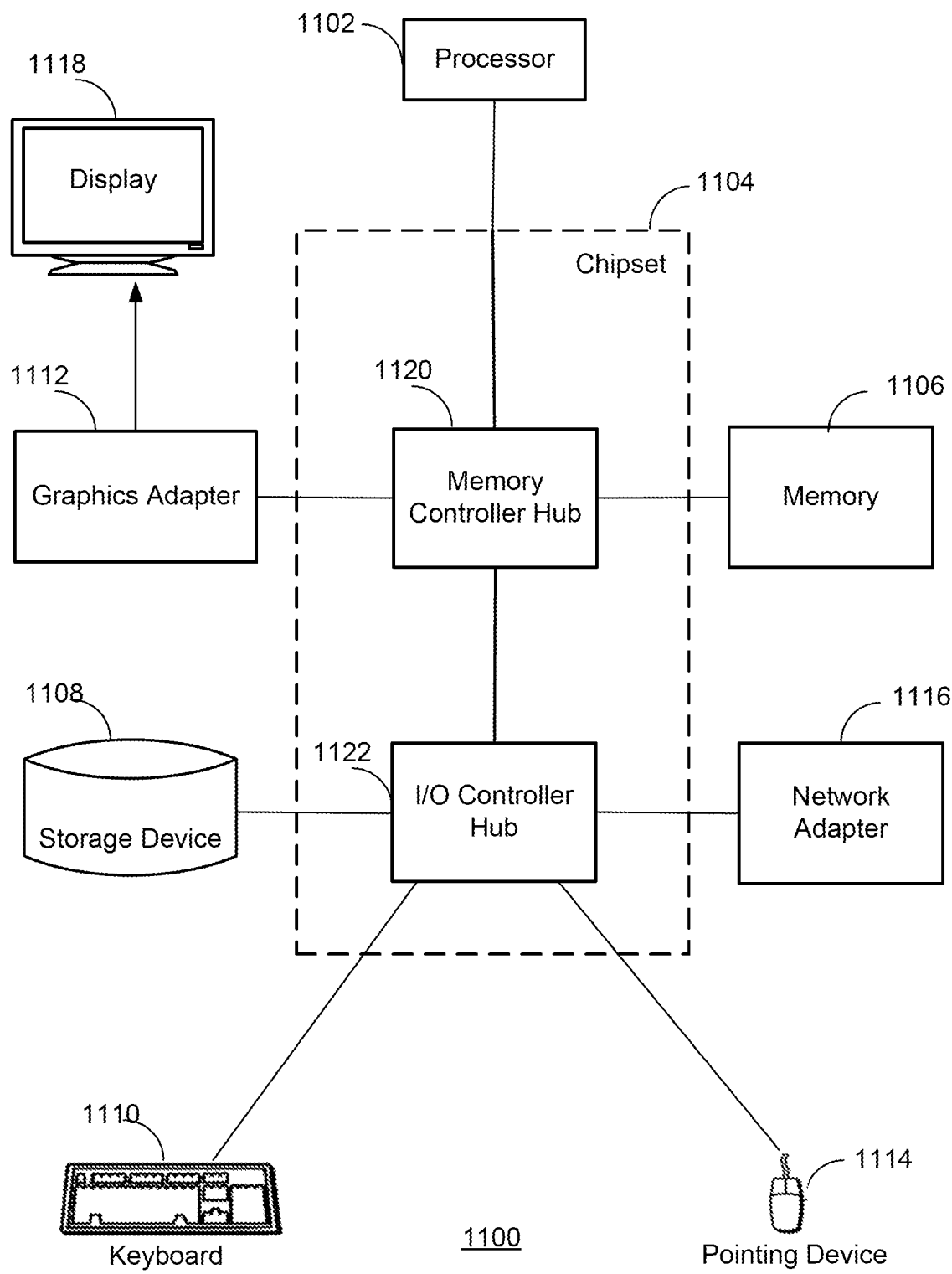
FIG. 11 is a block diagram illustrating a functional view of a typical computer system for use in the environment of FIG. 1 according to one embodiment.

FIG. 11 is a high-level block diagram illustrating a functional view of a typical computer system for use as one of the entities illustrated in the environment 100 of FIG. 1 according to an embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is a non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 200. The graphics adapter 1112 displays images and other information on the display 1118. The network adapter 1116 couples the computer system 1100 to a network.

As is known in the art, a computer 1100 can have different and/or other components than those shown in FIG. 11. In addition, the computer 1100 can lack certain illustrated components. For example, a computer system 1100 acting as an online system 110 may lack a keyboard 1110 and a pointing device 1114. Moreover, the storage device 1108 can be local and/or remote from the computer 1100 (such as embodied within a storage area network (SAN)).

The computer 1100 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1108, loaded into the memory 1106, and executed by the processor 1102.

The types of computer systems 1100 used by the entities of FIG. 1 can vary depending upon the embodiment and the processing power used by the entity. For example, a client device 104 may be a mobile phone with limited processing power, a small display 1118, and may lack a pointing device 1114. The online system 110 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for upgrading database management systems deployed on a cloud platform for a multi-tenant system, the method comprising:

receiving a request to upgrade a database management system deployed on a cloud platform, the database management system stored using:
  an instructions storage unit storing instructions of the database management system for processing data of a database; and
  a data storage unit storing data of the database;
receiving a cloud platform image comprising:
  instructions for the database management system, and
  a multi-tenant schema template;
creating a new instructions storage unit at the cloud platform;
deploying the cloud platform image on the new instructions storage unit;
determining whether a multi-tenant schema exists on the database stored on the data storage unit;
responsive to determining that the multi-tenant schema exists on the data storage unit, determining the multi-tenant schema template of the cloud platform image has a newer version of multitenant schema compared to the database;
executing instructions stored in the cloud platform image for upgrading the multi-tenant schema of the database stored in the data storage unit;
building an upgraded database management system by detaching the instructions storage unit from the data storage unit, and attaching the new instructions storage unit to the data storage unit, such that the instructions storage unit no longer has access to the data storage unit, and the new instructions storage unit is provided access to the data storage unit; and
providing access to the upgraded database management system to tenants of the multi-tenant system.

2. The method of claim 1, wherein the data storage unit is configured to be attached to any instructions storage unit.

3. The method of claim 1, wherein the instructions storage unit comprises:
  a system storage unit storing operating systems instructions; and
  an application storage unit storing instructions of the database management system.

4. The method of claim 3, wherein the application storage unit further stores:
  one or more database configuration files;
  one or more schema templates; and
  provisioning instructions.

5. The method of claim 4, wherein the one or more schema templates comprise the multi-tenant schema template for configuring the database management system for storing data of multiple tenants.

6. The method of claim 1, wherein the cloud platform image is configured to be deployed on any one of a plurality of cloud platforms.

7. The method of claim 1, further comprising:
preventing sharing of data across the instructions storage unit and the data storage unit.

8. The method of claim 1, further comprising:
responsive to determining that the multi-tenant schema does not exist on the data storage unit, creating the multi-tenant schema based on the multi-tenant schema template.

9. A computer implemented method for upgrading database management systems deployed on a cloud platform, the method comprising:
receiving a request to upgrade a database management system deployed on a cloud platform, the database management system comprising:
  a data storage unit for storing data of a database; and
  an instructions storage unit for storing executable instructions;
receiving a cloud platform image comprising:
  instructions for the database management system, and
  a multi-tenant schema template;
creating a new instructions storage unit at the cloud platform;
deploying the cloud platform image on the new instructions storage unit;
determining whether a multi-tenant schema exists on the database stored on the data storage unit;
responsive to determining that the multi-tenant schema exists on the data storage unit, determining the multi-tenant schema template of the cloud platform image has a newer version of multitenant schema compared to the database;
executing instructions stored in the cloud platform image for upgrading the multi-tenant schema of the database stored in the data storage unit;
building an upgraded database management system by detaching the instructions storage unit from the data storage unit, and attaching the new instructions storage unit to the data storage unit, such that the instructions storage unit no longer has access to the data storage unit, and the new instructions storage unit is provided access to the data storage unit; and
providing access to the upgraded database management system to users.

10. The computer implemented method of claim 9, wherein the cloud platform image further stores a schema template, the method further comprising:
responsive to determining that a schema exists on the data storage unit, determining whether the schema template of the cloud platform image has a newer version compared to the schema of the data storage unit; and
executing instructions stored in the cloud platform image for upgrading the schema of the database stored in the data storage unit.

11. The method of claim 10, further comprising:
responsive to determining that the schema does not exist on the data storage unit, creating the schema based on the schema template.

12. The method of claim 9, further comprising:
preventing sharing of data across the instructions storage unit and the data storage unit.

13. A computer system comprising:
a computer processor; and
a non-transitory computer readable storage medium for storing instructions that when executed by the computer processor cause the computer processor to perform steps comprising:
  receiving a request to upgrade a database management system deployed on a cloud platform, the database management system stored using:
    an instructions storage unit storing instructions of the database management system for processing data of a database; and
    a data storage unit storing data of the database;
  receiving a cloud platform image comprising:
    instructions for the database management system, and
    a multi-tenant schema template;
  creating a new instructions storage unit at the cloud platform;
  deploying the cloud platform image on the new instructions storage unit;

determining whether a multi-tenant schema exists on the database stored on the data storage unit;

responsive to determining that the multi-tenant schema exists on the data storage unit, determining the multi-tenant schema template of the cloud platform image has a newer version of multitenant schema compared to the database;

executing instructions stored in the cloud platform image for upgrading the multi-tenant schema of the database stored in the data storage unit;

building an upgraded database management system by detaching the instructions storage unit from the data storage unit, and attaching the new instructions storage unit to the data storage unit, such that the instructions storage unit no longer has access to the data storage unit, and the new instructions storage unit is provided access to the data storage unit; and providing access to the upgraded database management system to tenants of the database.

14. The computer system of claim 13, wherein the data storage unit is configured to be attached to any instructions storage unit.

15. The computer system of claim 13, wherein the instructions storage unit comprises:

a system storage unit storing operating systems instructions; and an application storage unit storing instructions of the database management system.

16. The computer system of claim 15, wherein the application storage unit further stores:

one or more database configuration files;

one or more schema templates; and provisioning instructions.

17. The computer system of claim 16, wherein the one or more schema templates comprise the multi-tenant schema template for configuring the database management system for storing data of multiple tenants.

18. The computer system of claim 13, wherein the cloud platform image is configured to be deployed on any one of a plurality of cloud platforms.

19. The computer system of claim 13, wherein the instructions further cause the computer processor to perform steps comprising:

preventing sharing of data across the instructions storage unit and the data storage unit.

20. The computer system of claim 13, wherein the instructions further cause the computer processor to perform steps comprising:

responsive to determining that the multi-tenant schema does not exist on the data storage unit, creating the multi-tenant schema based on the multi-tenant schema template.

* * * * *